United States Patent Office 3,511,816
Patented May 12, 1970

3,511,816
WATER SOLUBLE POLYBUTADIENE COATING
Gazi Basher Mourad Dickakian, Oxford, England, assignor to Esso Research and Engineering Company, a corporation of Delaware
No Drawing. Filed Jan. 26, 1967, Ser. No. 611,842
Int. Cl. C08d 5/04; C08f 3/70, 27/08
U.S. Cl. 260—78.4                                      8 Claims

ABSTRACT OF THE DISCLOSURE

Alpha-beta unsaturated dicarboxylic acids such as maleic anhydrides are reacted with high molecular weight 1,4-polymers or copolymers of conjugated diolefins such as polybutadiene in an amount sufficient to form an adduct whose ammonium salt is substantially soluble in water. Aqueous solutions of salts of these adducts can be used for a wide variety of coating applications.

---

This invention relates to resins and water-soluble coating compositions derived from polymers and copolymers of conjugated diolefins.

It is well known that relatively low-molecular-weight polybutadienes, butadienestyrene copolymers and various modification products thereof are capable of forming coatings that firmly adhere to metals and protect them against corrosion. However, the known coating materials derived from butadiene are not water-soluble and can be thinned only by means of organic solvents. On the other hand, the water-soluble resins presently used as coating materials, e.g. the commercial melamine, alkyd urea, and acrylic resins, do not always meet the requirements of the coating industry, such as low price, hydrolytic stability and good film properties.

It has now been found in accordance with the present invention that new valuable resins can be obtained by reacting high 1,4 polymers or copolymers of conjugated diolefins with an α,β-unsaturated dicarboxylic compound, such as maleic anhydride, in an amount sufficient to form an adduct substantially soluble in aqueous ammonia solutions. Such adducts are eminently suitable for use as a basis of water-soluble coating materials.

It has also been found according to the present invention that certain derivatives of the above polymer and copolymer adducts, i.e. their oxidation, hydroxylation/ formoxylation, and epoxidation products, yield water-soluble coating materials forming films of superior properties.

The term "α,β-unsaturated dicarboxylic compound" as used herein refers to α,β-unsaturated dicarboxylic acids, their anhydrides, imides, mono esters and mono amides, e.g. maleic acid, fumaric acid, maleic anhydride, maleic imide, mono methyl maleate, and melamic acid.

The expression "high 1,4 polymers or copolymers of conjugated diolefins" as used in the description of this invention refers to materials having at least 50%, preferably 75–85% of their diolefinic units added in 1,4 configuration, containing a major molar proportion of diolefins in the case of copolymers, and being characterized by number average molecular weights within the range of 500 to 10,000, preferably 1,000 to 4,000.

Representative samples of conjugated diolefins which can be employed to make the above polymers and copolymers are butadiene and isoprene. Among the co-monomers which can be copolymerized with the conjugated diolefins are styrene, mesityl oxide, acrylonitrile, and α-olefins.

High 1,4 polymers and copolymers of conjugated diolefins that are suitable for use in the practice of the present invention include polybutadiene, polyisoprene and copolymers of butadiene and isoprene with styrene and mesityl oxide containing up to 30 mole percent of styrene and/or mesityl oxide which have the above-specified structure and molecular weights. A preferred starting material is polybutadiene having 75–85% 1,4 structure and an average molecular weight within the range of 1,000 to 4,000.

To make the new resins of the present invention, the high 1,4 polymer or copolymer is reacted with an α,β-unsaturated dicarboxylic compound in an amount sufficient to form an adduct whose ammonium salt is substantially soluble in water. Depending upon the nature and molecular weights of the components, varying amounts of the dicarboxylic compound are required to achieve the desired degree of water-solubility. Thus, when using maleic anhydride it is advisable to aim at adducts containing 10 to 30% of chemically bound maleic anhydride since such materials form salts sufficiently soluble in water or water-alcohol mixtures.

In carrying out the reaction of the high 1,4 polymer or copolymer with the α,β-unsaturated dicarboxylic compound, e.g. maleic anhydride, the components are heated together at a temperature high enough to ensure the adduct formation within a reasonable time. Generally temperatures ranging from 150° to 240° are suitable for this purpose. Although the reaction can be effected in high-boiling solvents, e.g. Decalin, it is preferred to work without a solvent. The duration of the reaction depends upon the temperature and the extent of addition desired. At temperatures within the above-indicated range, useful products are obtained by heating the components for 15 minutes to 5 hours, preferably 1 to 1½ hours.

Various methods may be employed to free the reaction mixture from the unreacted dicarboxylic compound, such as extraction with water or heating under reduced pressure. A very convenient and efficient method involves maintaining the reaction mixture in a vacuum of 1 to 5 mm. Hg at a temperature of 150° to 250° C. so as to distill off the unconverted α,β-unsaturated dicarboxylic compound. Under these conditions adducts containing <0.2% wt. maleic anhydride can be obtained in a matter of 30 min. to 1 hour.

The adducts thus formed serve as the basis of the coating compositions of this invention. They may be used either as such or in the form of certain chemical modification products to prepare aqueous resin solutions suitable for a great variety of coating applications.

According to a first embodiment of the present invention, the above adducts are converted into water-soluble salts without any further chemical modifications.

According to a second embodiment of the present invention, the above adducts are modified by oxidation, hydroxylation/formoxylation or epoxidation prior to the salt formation.

According to a third embodiment of the present invention, the unmodified adducts or their modification products are at first reacted with an amino or hydroxyl-group-containing compound and then brought into aqueous solution.

Both the salt formation and the optional reaction of the adducts or their modification products with an aminoor hydroxyl-group-containing compound are carried out by methods which are independent of the particular nature of the resinous material, i.e. unmodified adduct or adduct modified by oxidation, hydroxylation/formoxylation or epoxidation. Therefore, these two steps will be described later.

Although the unmodified adducts form coatings that are completely satisfactory in some applications, other uses may require a modification of the characteristics of the base resin, such as solubility, viscosity and film properties. It has been found according to the present invention that such a modification can be accomplished by three types of reactions, i.e. oxidation, hydroxylation/formoxylation and epoxidation. In this fashion the characteristics of the base resin can be tailored to particular applications.

The oxidation of the adducts results in the introduction of carboxyl and other functional groups, i.e. hydroxyl, carbonyl and epoxy groups. To effect this kind of a modification the adduct is dissolved in a suitable solvent and treated with air or oxygen at elevated temperature and in the presence of an oxidation catalyst. The solvent may be a hydrocarbon, such as toluene and xylene, or a ketone, such as methyl isobutyl ketone. Generally a small amount of a conventional oxidation catalyst, e.g. manganese naphthenate, is added to the resin solution. The oxidation is advantageously conducted at a temperature of 90° to 150° C. for a period of ½ to 6 hours. Thus, the desired degree of oxidation may be obtained by passing oxygen into a 25–50% solution of the resin in an aromatic hydrocarbon at a temperature of 110° to 120° C. for a period of 15 minutes to 4 hours. Under these conditions the concentration of the oxidation catalyst may be of the order of 250 to 1,000 p.p.m.

Another type of modification contemplated by the present invention consists in the introduction of hydroxylformoxyl groups by reaction of the adducts with performic acid. Similar modifications can be effected by reaction of the adducts with other organic peracids.

This kind of a modification, referred to as hydroxylation/formoxylation, takes place if a solution of the adduct, preferably in a chlorinated hydrocarbon, such as chloroform or carbon tetrachloride, is treated with performic acid at a temperature between 45° and 80° C. and preferably between 50° and 55° C. The amount of performic acid used may range from 0.1 to 2 moles per butadiene unit in the adduct. Instead of preformed performic acid, performic acid prepared in situ from hydrogen peroxide and formic acid, preferably in a molar ratio of about 1:3 to promote epoxy ring opening can be employed in the reaction whereby explosion hazards are eliminated. The reaction time is generally within the range of 10 minutes to 24 hours.

Finally, the adducts can be modified by epoxidation with a peracid or another suitable epoxidizing agent. To prevent cleavage of the epoxy ring the reaction is preferably conducted at a temperature below 45° C. Suitable reaction times are within the range of 1 hour to 4 hours. Like the hydroxylation/formoxylation, the epoxidation proceeds readily in a chlorinated hydrocarbon solvent. The preferred epoxidizing agent is peracetic or a mixture of acetic acid with hydrogen peroxide, advantageously in a molar ratio of about 1:1.

The above-described modification products are isolated from their solutions by distilling off the solvent under reduced pressure. If an aqueous phase is present the organic solution of the product is at first separated off by decantation or other means. It is generally advisable to wash the organic layer with water before the solvent is removed.

Both the unmodified adducts and their modification products may be stabilized by the addition at room temperature of n-butanol or another alcohol. The solutions thus obtained can be stored over long periods.

The application of the present coating compositions in aqueous solutions involves a solubilization of the acidic resins by salt formation. However, as already mentioned, the salt formation may be preceded by a reaction of the adducts or their modification products with an amino- or hydroxyl-group-containing compound.

The amino- and hydroxyl-group containing substances suitable for this optional reaction include amines, amino alcohols and alcohols. Among the amines, there may be mentioned ethyl amine, propyl amine, butyl amine, ethylene diamine, butylene diamine, hexamethylene diamine, and triethylene tetramine, while ethanol amine, diethanol amine, and trimethylol methyl amine are representative of useful amino alcohols. The list of suitable alcohols comprises n-butanol, n-hexanol, n-octanol, ethylene glycol, dihydroxypropionic acid, etc.

The conditions of the reaction depend upon the nature of the reactant. Thus, a temperature below 30° C. and a reaction time of 10 to 30 minutes will generally suffice to complete the reaction of the adduct or its modification product with an amine. On the other hand, a temperature of 110° to 120° and a reaction time of 30 to 60 minutes may be required to bring about conversion of the adduct or its modification product into an ester contact with an alcohol.

In both cases the reaction is advantageously conducted in a solvent, e.g. toluene or xylene, although the use of a solvent is not mandatory.

The molar ratio of the adduct or its modification product to the amine or alcohol used in this reaction may vary within wide limits. In general, however, the proportions of the reactants will be chosen so as to provide 0.5 to 1.5 mols of $NH_2$ or OH per 1 mol of anhydride in the adduct or modified adduct. Thus one mole of the anhydride in the adduct may be reacted with one mol of butyl amine or n-hexanol or with half a mol of ethanol amine or ethylene glycol.

The recapitulate, the present invention provides new coating compositions derived from acidic resins of the following types:

(1) Adducts formed from high 1,4 polymers or copolymers of conjugated diolefins and an $\alpha,\beta$-unsaturated dicarboxylic compound which are substantially soluble in aqueous ammonia solutions;

(2) Oxidation products of (1);
(3) Hydroxylation/formoxylation products of (1);
(4) Epoxidation products of (1);
(5) Reaction products of (1), (2), (3) and (4) with a compound containing an amino- and/or hydroxyl-group.

The above resins can be used either alone or in the form of blends with conventional water-soluble resins, such as melamine resins, urea resins, and the like. The composition of these blends may be varied within wide limits, but generally the proportion of the conventional resins in such blends will not exceed 50% by weight, based on total mixture.

Referring now to the application of the new resins, water-soluble coating compositions are obtained by reacting the resin with an alkaline substance to form a salt that is soluble in water or mixtures of water with organic hydroxyl-containing compounds. The salt formation occurs instantaneously and can be effected by mixing at room temperature of the acidic resin with a great variety of alkaline materials, such as ammonia, sodium hydroxide and amines of sufficient basicity, e.g. triethyl amine.

A particularly easy and advantageous method of solubilization by salt formation involves treating the acidic resin with gaseous or aqueous ammonia.

The solubility of the salts thus obtained depends, inter alia, upon the nature and the amount of chemically bound acid contained in the resin. Thus, the incorporation of 30% of maleic anhydride into high 1,4-polybutadiene leads to an adduct whose ammonium salt can be dissolved in water alone whereas mixtures of water with a suitable cosolvent, e.g. alcohols and esters, are required to prepare clear solutions of the ammonium salts of high 1,4-polybutadiene adducts containing only 10 to 15% of chemically bound maleic anhydride.

The nature of the cosolvent, if any, may affect the properties of the coating compositions of the present invention. Thus it has been found that particularly good films result from aqueous solutions of maleinized high 1,4 polybutadiene ammonium salts containing n-butoxy ethanol, or n-butoxy ethanol and 2-ethyl n-hexanol, or n-butoxy ethanol and n-octanol.

In the case the the ammonium salts, it is advisable to adjust the pH of the aqueous solution to a value of 7–8. This can be done by mixing the acidic resin base with sufficient ammonia solution or by adding the required amount of ammonia to a previously prepared ammonium salt solution.

The coating compositions of the present invention have many uses. They are particularly suitable for use as primers on metal objects, such as automobile bodies, metal boxes, cans, typewriters and household appliances. They can be applied to the object to be coated by all conventional methods, such as dipping, brushing, spraying and electrodeposition.

The application of the coating compositions by electrodeposition gives excellent results. In this technique the resins may be used in the form of dilute aqueous solutions of their ammonium salts. Suitable concentrations are 5% for unpigmented resin and 10% for pigmented material.

The application of the new resins to the object to be coated is followed by a conventional cure, e.g. stoving or baking at 130° to 180° for 30 minutes.

The present resins have excellent properties. Among their advantages over comparable materials are their good electrodeposition characteristics and their great hydrolytic stability.

EXAMPLE 1

Preparation of high 1,4 polybutadiene 181 mls. of a 15% solution in n-hexane of butyl lithium catalyst was added under nitrogen blanketing to 3 litres of toluene. 1200 mls. of 1,3-butadiene were added slowly with stirring over a 2 hour period with the temperature maintained at 40° C. The solvent was removed by vacuum distillation to leave a yield of 729 gms. of polymer having the following characteristics.

| | |
|---|---|
| Number average molecular weight | 2700–3000 |
| Peroxide content (p.p.m.) | 1–30 |
| Iodine value | 350–400 |
| Microstructure: | |
| 1,2 c=c% | 15 |
| Cis 1,4 c=c% | 17 |
| Trans 1,4 c=c% | 68 |

When films of 1.0 mil. thickness of the above-mentioned polybutadiene were cured for 30 minutes at 170° C., 180° C. or 190° C. no satisfactory cure was obtained.

EXAMPLE 2

Preparation of maleinized polybutadiene 80 gms. of polybutadiene prepared as in Example 1 and 20 gms. of technical grade maleic anhydride were heated for 1 hour at 200° C. under nitrogen blanketing with efficient stirring. Unreacted maleic anhydride was removed by distillation at 200° C. under reduced pressure, resulting in a maleinized polymer having an acid value of 170 to 190 mg. KOH/g. This acid value corresponds to the incorporation of around 16% maleic anhydride.

EXAMPLE 3

Preparation of amide-ammonium salt of maleinized polybutadiene

The maleinized polybutadiene prepared as in Example 2 above was rendered water soluble by reacting it with aqueous ammonium hydroxide solution at room temperature to pH 7–8. Other water soluble resins can be obtained by:

(1) Reacting maleinized polymer with mono-ethanolamine or diethanolamine.

(2) Reacting the maleinized polymer with alkyl amine e.g. ethylamine.

(3) Esterifying maleinized polybutadiene first with up to 1 mol proportion of alcohol e.g. n-butanol, n-hexanol or n-octanol at 110° C. for 30 minutes and then forming the ammonium salt by reacting at room temperature with ammonium hydroxide solution to pH 7–8.

EXAMPLE 4

Hydroxylation/formoxylation of maleinized polybutadiene 50 gms. of maleinized polybutadiene prepared as in Example 2 were dissolved in 250 gms. chloroform and 28 mls. 90% formic acid were added. To this solution were added, over a period of 15 minutes, 12.6 gms. of 50% hydrogen peroxide. The reaction mixture was stirred for 1½ hours at a temperature maintained at 50° C.±1° C. The organic layer was separated and the solvent removed under reduced pressure to leave the hydroxylated-formoxylated maleinized polymer which had a hydroxyl value of 175–225 mg. KOH/g. The amide-ammonium salt of the hydroxylated polymer was prepared by the addition of aqueous ammonium hydroxide solution at room temperature to pH 7–8. The degree of hydroxylation can of course be varied by controlling the quantity of formic acid added during the reaction, temperature and time.

EXAMPLE 5

Preparation of epoxidised maleinized polybutadiene 50 gms. of meleinized polybutadiene as a 25% solution in toluene was oxidised using manganese naphthenate catalyst (250–1,000 p.p.m.) with oxygen blowing at the rate of 10 ml./gm./min. at 110–115° C. for .3 hour. The toluene was removed by distillation under reduced pressure and 5 gms. of n-butoxy ethanol were added to stabilize the resin. The amide-ammonium salt of the oxidised polymer was prepared by adding aqueous ammonium hydroxide solution at room temperature to pH 7–8.

EXAMPLE 6

Preparation of epoxidised maleinized polybutadiene

To a solution of 56 gms. of maleinized polybutadiene prepared as in Example 2 in 280 gms. of chloroform was added dropwise 15 gms. 38% peracetic acid.

The reaction mixture was stirred at 40° C. for 1½ hours. The organic layer which was separated was washed with water and the solvent removed under reduced pressure to leave the epoxidised maleinized polymer. 5 gms. of n-butoxy ethanol were added to stabilise the resin. The amide-ammonium salt of the epoxidised maleinized polybutadiene was prepared by adding ammonium hydroxide solution at room temperature to a pH 7–8.

EXAMPLE 7

Preparation of an electrodepositable paint 150 parts by weight of the amide ammonium salt of Example 3, 40 parts by weight of n-butoxy ethanol, 10 parts by weight of 2-ethyl n-hexanol, and 80 parts by weight of micronized synthetic red oxide were ground together in a ball mill or triple roller mill, the pH being adjusted to 7–7.5 by means of aqueous ammonia. The resulting mixture was diluted with deionized water to give a solution containing 10–15% by weight total solids.

EXAMPLE 8

The properties of films prepared from resins of the present invention are shown in the following tables:

TABLE I.—FILM PROPERTIES OF AMIDE-AMMONIUM SALT OF MALEINISED HIGH 14 POLYBUTADIENE

| Run Number | 570/89B | 570/89D | 570/89D | 570/89D | 570/89C | 570/89C | 570/89C |
|---|---|---|---|---|---|---|---|
| Maleinised (1,4) polybutadiene: | | | | | | | |
| Number, average mol. wt | 2,700 | 2,700 | 2,700 | 2,700 | 2,700 | 2,700 | 2,700 |
| Microstructure: | | | | | | | |
| 1, 2% | 15 | 15 | 15 | 15 | 15 | 15 | 15 |
| Cis 1, 4% | 17 | 17 | 17 | 17 | 17 | 17 | 17 |
| Trans 1, 4% | 68 | 68 | 68 | 68 | 68 | 68 | 68 |
| Acid Value (mg. KOH/g.) | 77 | | | | 137 | | 170.5 |
| Film Application:[1] | | | | | | | |
| Stoving schedule (mins./° C.) | 30/170 | 30/170 | 30/180 | 30/190 | 30/170 | 30/180 | 30/190 |
| Film thickness (mil) ±0.1 | 1.0 | 1.0 | 1.0 | 1.0 | 1.0 | 1.0 | 1.0 |
| Solvent | | | Butoxy ethanol/water | | | | |
| pH | 7-8 | 7-8 | 7-8 | 7-8 | 7-8 | 7-8 | 7-8 |
| Film Properties: | | | | | | | |
| Direct impact (in. lb.) | 80 | 160 | 140 | 100 | 140 | 140 | 30 |
| Reverse impact (in. lb.) | 60 | 160 | 140 | <5 | 150 | 140 | <5 |
| Ericksen (mm.) | 8.8 | 6.0 | 7.0 | 2.0 | >9.0 | 9.0 | 3.0 |
| Flexibility (dia.) (in.) | 1/8 | 1/8 | 3/16 | 13/16 | 1/8 | 1/8 | 3/8 |
| Hardness (pencil) | H | 3B | HB | 5H | B | HB | 5H |
| Cure | | | | Satisfactory | | | |

[1] Resins spun (I.C.I. Spinner) on Bonderite 97T.

TABLE II.—FILM PROPERTIES OF THE AMIDE-AMMONIUM SALT OF HYDROXYLATED-FORMOXYLATED MALEINISED (HIGH 1,4) POLYBUTADIENE

| Run Number | 570/88B | 570/88B | 570/88B | 487/91 | 487/91 | 487/91 |
|---|---|---|---|---|---|---|
| Maleinised (1,4) polybutadiene: | | | | | | |
| Number, average mol. wt | 2,700 | 2,700 | 2,700 | 2,700 | 2,700 | 2,700 |
| Microstructure: | | | | | | |
| 1, 2% | 15 | 15 | 15 | 15 | 15 | 15 |
| Cis 1, 4% | 17 | 17 | 17 | 17 | 17 | 17 |
| Trans 1, 4% | 68 | 68 | 68 | 68 | 68 | 68 |
| Acid value (mg. KOH/g.) | 192 | 192 | 192 | 192 | 192 | 192 |
| Hydroxylation: | | | | | | |
| $H_2O_2$ (mole):BD (mole) | 1:5 | 1:5 | 1:5 | 1:2.5 | 1:2.5 | 1:2.5 |
| $H_2O_2$ (mole):Acid (mole) | 1:3 | 1:3 | 1:3 | 1:3 | 1:3 | 1:3 |
| Polymer (g.):Solvent (g.) | 1:5 | 1:5 | 1:5 | 1:5 | 1:5 | 1:5 |
| Hydroxylation Temp. (°C.) | 45-50 | 45-50 | 45-50 | 45-50 | 45-50 | 45-50 |
| Hydroxylation time (hrs.) | 1½ | 1½ | 1½ | 1½ | 1½ | 1½ |
| Film Application:[2] | | | | | | |
| Stoving schedule (mins./° C.) | 30/160 | 30/165 | 30/170 | 30/160 | 30/165 | 30/170 |
| Film thickness (mil) ±0.1 | 1.0 | 1.0 | 1.0 | 1.0 | 1.0 | 1.0 |
| Solvent | | | Butoxy ethanol/water | | | |
| pH | 7-8 | 7-8 | 7-8 | 7-8 | 7-8 | 7-8 |
| Film Properties: | | | | | | |
| Direct impact (in. lb.) | 160 | 90 | 55 | 100 | 45 | 78 |
| Reverse impact (in. lb.) | 160 | 45 | 5 | 30 | 5 | 5 |
| Ericksen (mm.) | 8 | 7.5 | 5 | 9.0 | 6.0 | 9.0 |
| Flexibility (dia.) (in.) | 1/8 | | 7/16 | 1/8 | 7/16 | 1/8 |
| Hardness (pencil) | HB | 2H | 3H | H | 2H | 3H |
| Cure | [1] Soften Satisfactory | | | [1] Soften Satisfactory | | |

[1] Film softened but not removed when rubbed with acetone.
[2] Resins spun (I.C.I. Spinner) on Bonderite 97T.

TABLE III.—FILM PROPERTIES OF THE AMIDE-AMMONIUM OF OXIDISED MALEINISED HIGH 1,4 POLYBUTADIENE

| Run No | 570/90 | | |
|---|---|---|---|
| Maleinised (1,4) polybutadiene: | | | |
| Number, average mol wt | 2,700 | | |
| Microstructure: | | | |
| 1, 2% | 15 | | |
| Cis, 1, 4% | 17 | | |
| Trans 1, 4% | 68 | | |
| Acid Value (mg. KOH/g.) | 192 | | |
| Oxidation: | | | |
| Catalyst | ([1]) | | |
| Catalyst (p.p.m.) | 500 | | |
| Oxygen (ml./min./g.) | 10 | | |
| Oxidation temp. (° C.) | 110-115 | | |
| Oxidation time (hrs.) | 3 | | |
| Film Application:[2] | | | |
| Stoving schedule, mins./° C | 30/170 | 30/180 | 30/190 |
| Film thickness (mil) ±0.1 | 1.0 | 1.0 | 1.0 |
| Solvent | Butoxyethanol/water | | |
| pH | 7-8 | 7-8 | 7-8 |
| Film Properties: | | | |
| Direct impact (in. lb.) | 160 | 160 | 50 |
| Reverse impact (in. lb.) | 160 | 160 | 10 |
| Ericksen (mm.) | >9.0 | >9.0 | 2.0 |
| Flexibility (dia.) (in.) | 1/8 | 1/8 | H |
| Hardness (pencil) | 3B | B | 1 1/32 |
| Cure | | Satisfactory | |

[1] Manganese naphthenate.
[2] Resins spun (I.C.I. Spinner) on Bonderite 97T.

TABLE IV.—FILM PROPERTIES OF THE AMIDE-AMMONIUM SALT OF EPOXYDISED MALEINISED HIGH 1,4 POLYBUTADIENE.

| Run No | 570/100A | |
|---|---|---|
| Maleinised (1, 4) polybutadiene: | | |
| Number average mol. wt | 2,700 | |
| Microstructure: | | |
| 1, 2% | 15 | |
| Cis 1, 4% | 17 | |
| Trans 1, 4% | 68 | |
| Acid value (mg. KOH/g.) | 192 | |
| Epoxidation: | | |
| Peracetic Acid (mole):BD (mole) | 4.0:1.0 | |
| Polymer (g.):Solvent (g.) | 1:5 | |
| Epoxidation Temp. (° C.) | 40 | |
| Epoxidation Time (hrs.) | 1½ | |
| Film Application:[1] | | |
| Stoving schedule (mins./° C.) | 30/170 | |
| Film thickness (mil) ±0.1 | 1.0 | |
| Solvent | Butoxyethanol/-Toluene/water | |
| pH | 7-8 | 7-8 |
| Film Properties: | | |
| Direct impact (in. lb.) | 80 | 40 |
| Reverse impact (in. lb.) | 20 | 10 |
| Ericksen (mm.) | 5.0 | 5.4 |
| Flexibility (dia. (in.) | 8/32 | 11/32 |
| Hardness (pencil) | H | 2H |
| Cure | | Satisfactory |

[1] Resins spun (I.C.I. Spinner) on Bonderite 97T.

What is claimed is:

1. A process for making a water-soluble coating composition which comprises first reacting a polymer of a butadiene having at least 50% of its diolefinic units in 1,4 configuration and having a number of average molecular weight between 500 and 10,000 with an alpha,beta unsaturated dicarboxylic compound selected from the group consisting of maleic acid, maleic anhydride and fumaric acid in proportions sufficient to form an adduct containing 10 to 30% of the said alpha,beta unsaturated dicarboxylic compound and further reacting said adduct with an alkaline material selected from the group consisting of ammonia and basic amines to form a salt that is soluble in water or in a mixture of water and alcohols.

2. A process as defined in claim 1 wherein the polymer is a polybutadiene having 75–85% 1,4 structure and an average molecular weight within the range of 1,000 to 4,000.

3. A process as defined in claim 1 wherein the reaction is carried out in the absence of a solvent at a temperature of between 150° and 240° C.

4. A process wherein the adduct of claim 1 is subjected to oxidation involving a treatment with air or oxygen at a temperature of 90° to 150° C. in the presence of a conventional oxidation catalyst before being further reacted with the said alkaline substance.

5. A process wherein the adduct of claim 1 is subjected to hydroxylation/formoxylation involving a treatment with performic acid at a temperature of 45° to 80° C. before being further reacted with the said alkaline substance.

6. A process wherein the adduct of claim 1 is subjected to epoxidation involving a treatment with a peracid at a temperature below 45° C. before being further reacted with the said alkaline substance.

7. A process as defined in claim 6 wherein the peracid is peracetic acid.

8. A process as claimed in claim 1 wherein the adduct is reacted with a $C_2$–$C_{10}$ alkyl amine or alcohol before being further treated with the said alkaline substance.

References Cited

UNITED STATES PATENTS

| | | | |
|---|---|---|---|
| 2,836,568 | 5/1958 | Dazzi | 260—94.7 |
| 2,842,513 | 7/1958 | Fitzgerald et al. | 260—94.7 XR |
| 2,634,256 | 4/1953 | Sparks et al. | 260—78.4 |
| 2,733,267 | 1/1956 | Koenecke. | |
| 2,915,494 | 12/1959 | Snoddon. | |
| 2,927,100 | 3/1960 | Cantenino. | |

JOSEPH L. SCHOFER, Primary Examiner

W. F. HAMROCK, Assistant Examiner

U.S. Cl. X.R.

117—162; 260—29.7, 94.7, 680